May 22, 1956 C. FORNEY 2,746,491
MACHINE FOR PRODUCING CLOTHESPIN
Original Filed Feb. 25, 1948 17 Sheets-Sheet 1

Inventor
Charles Forney,
KARL W. FLOCKS
Attorney

May 22, 1956

C. FORNEY 2,746,491

MACHINE FOR PRODUCING CLOTHESPIN

Original Filed Feb. 25, 1948

Inventor
Charles Forney,
KARL W. FLOCKS
Attorney

May 22, 1956

C. FORNEY 2,746,491

MACHINE FOR PRODUCING CLOTHESPIN

Original Filed Feb. 25, 1948

Inventor
Charles Forney,
Karl W. Flocks
Attorney

May 22, 1956 C. FORNEY 2,746,491
MACHINE FOR PRODUCING CLOTHESPIN
Original Filed Feb. 25, 1948 17 Sheets-Sheet 5

Inventor
Charles Forney
KARL W. FLOCKS
Attorney

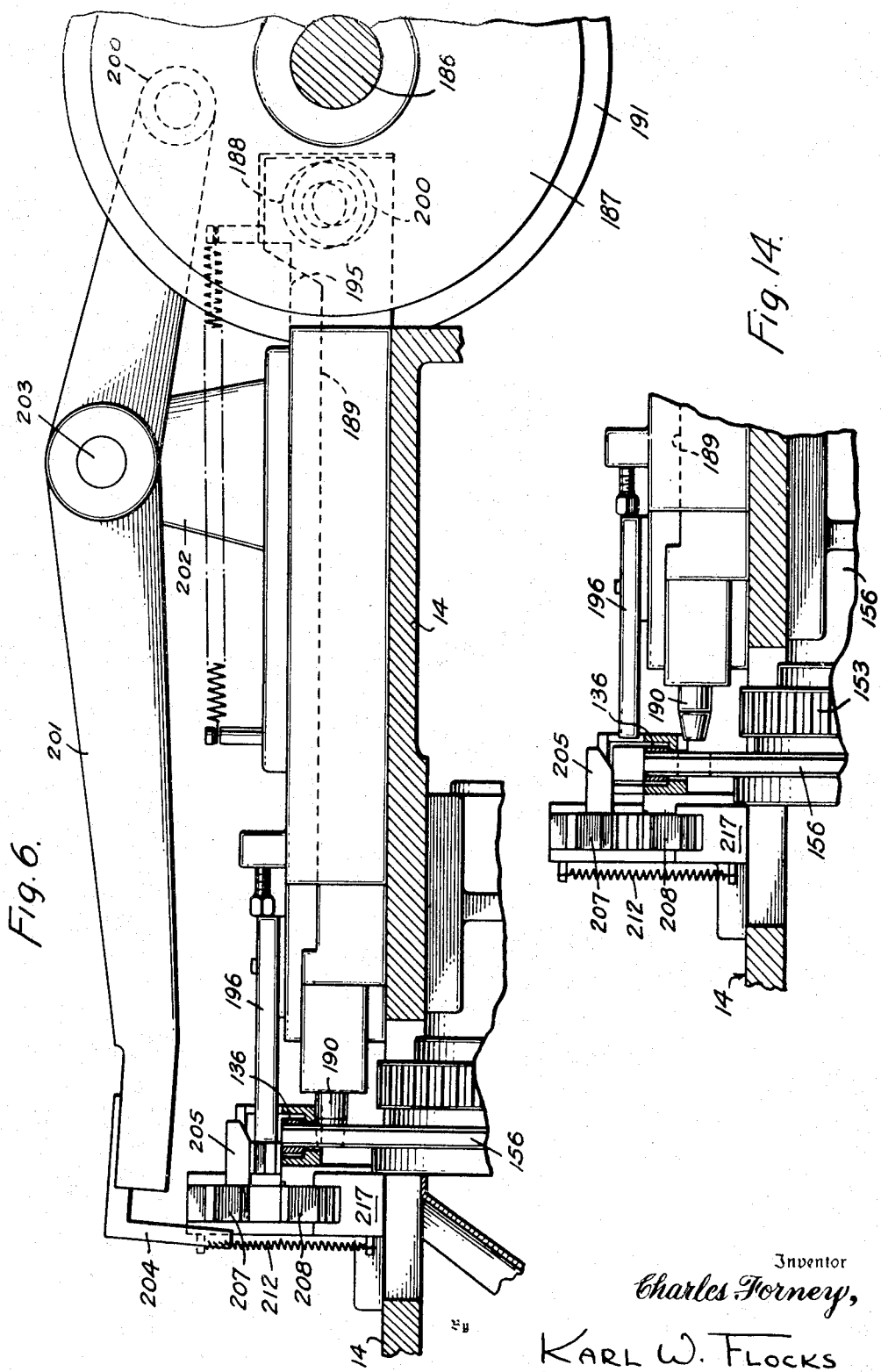

May 22, 1956
C. FORNEY
2,746,491
MACHINE FOR PRODUCING CLOTHESPIN
Original Filed Feb. 25, 1948
17 Sheets-Sheet 7
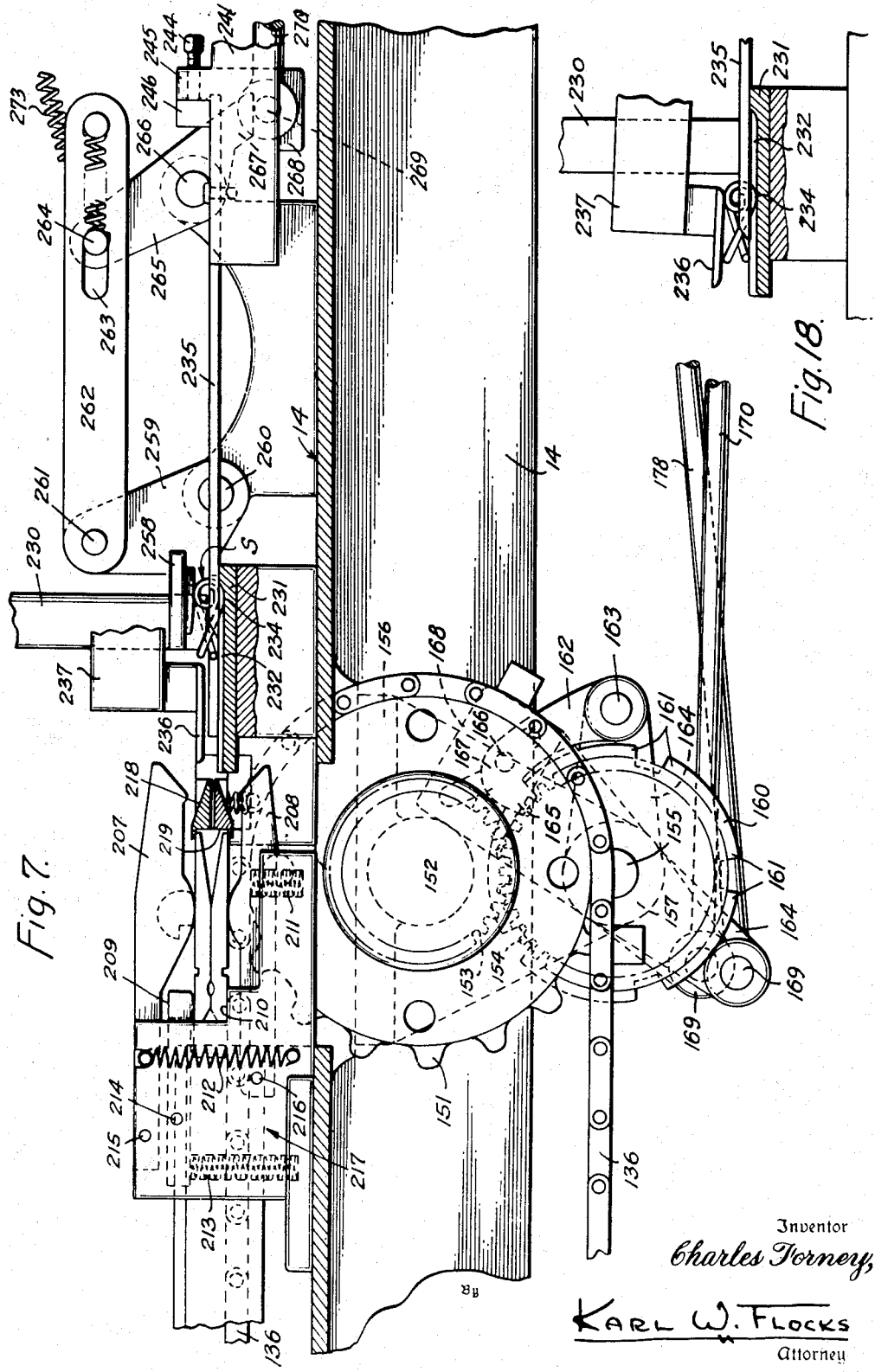
Inventor
Charles Forney,
Karl W. Flocks
Attorney May 22, 1956 C. FORNEY 2,746,491
MACHINE FOR PRODUCING CLOTHESPIN
Original Filed Feb. 25, 1948 17 Sheets-Sheet 8
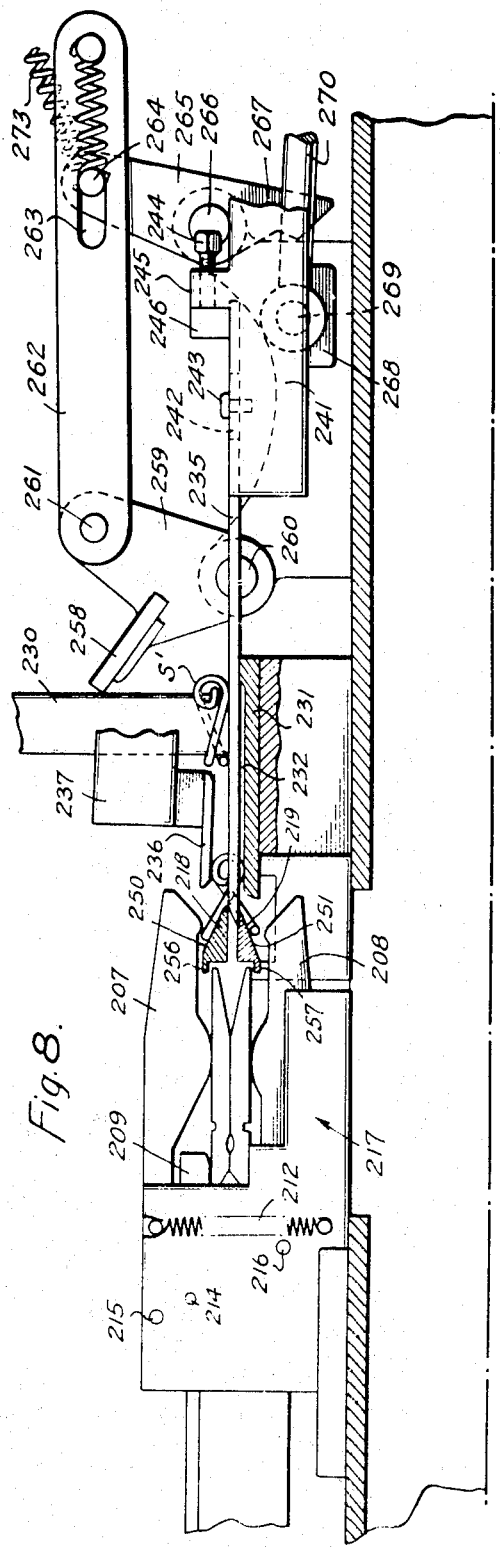
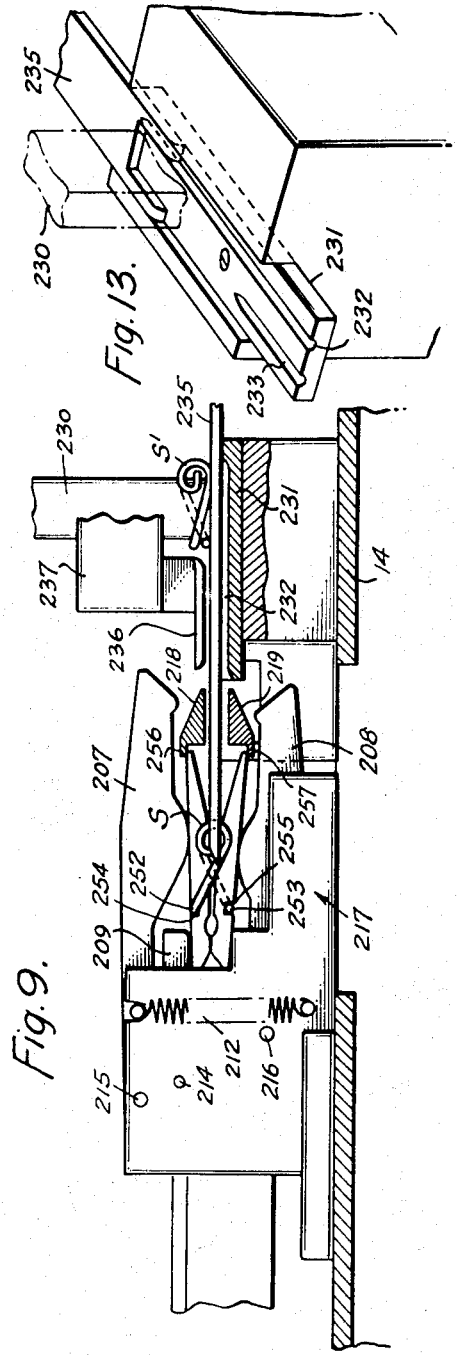
Inventor
Charles Forney,
Karl W. Flocks
Attorney

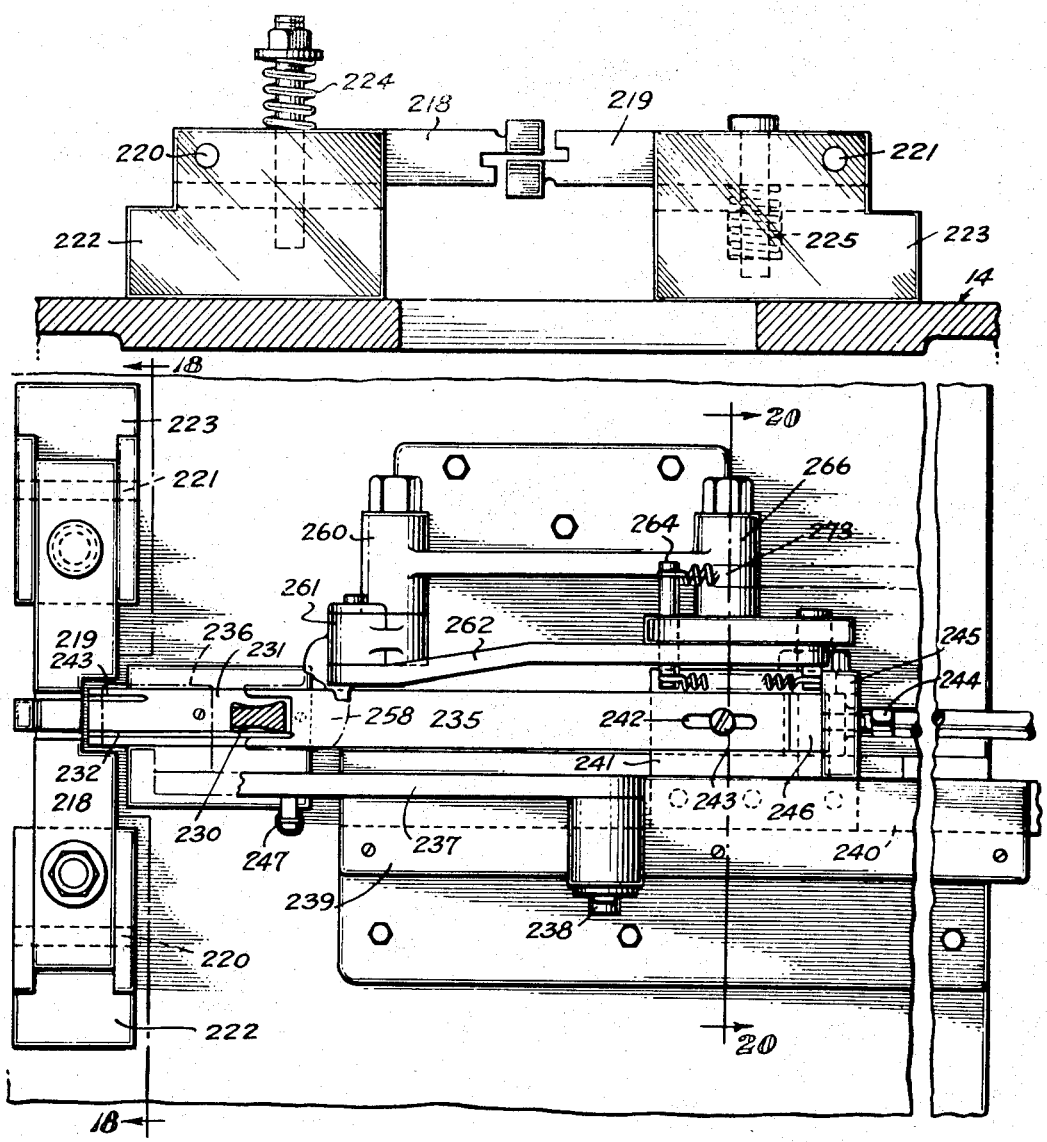

May 22, 1956  C. FORNEY  2,746,491
MACHINE FOR PRODUCING CLOTHESPIN
Original Filed Feb. 25, 1948  17 Sheets—Sheet 10

Inventor
Charles Forney

KARL W. FLOCKS
Attorney

May 22, 1956  C. FORNEY  2,746,491
MACHINE FOR PRODUCING CLOTHESPIN
Original Filed Feb. 25, 1948  17 Sheets-Sheet 11
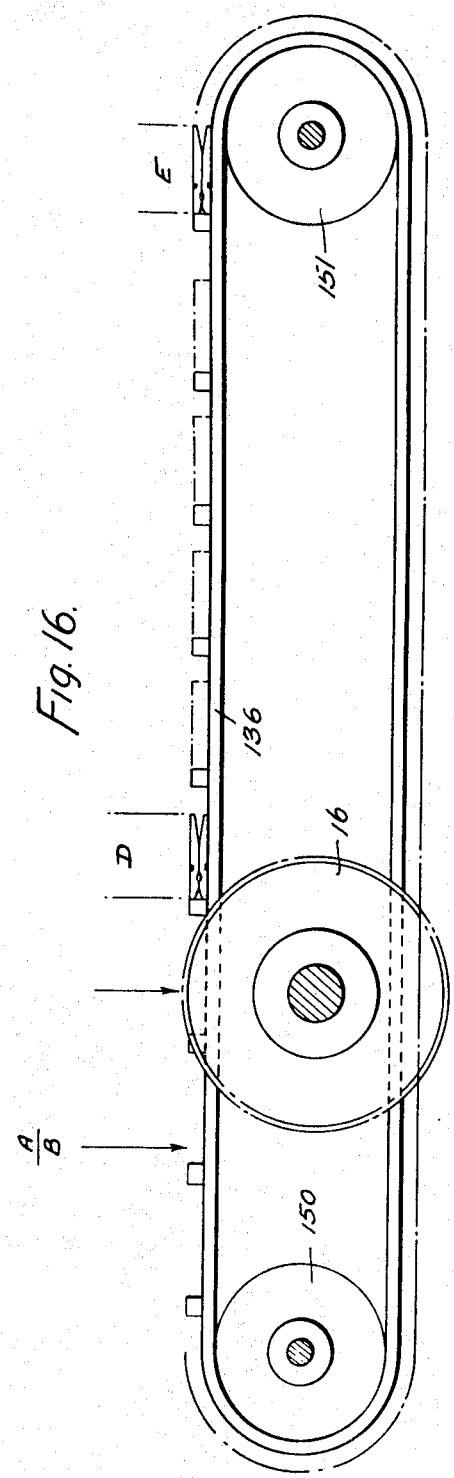
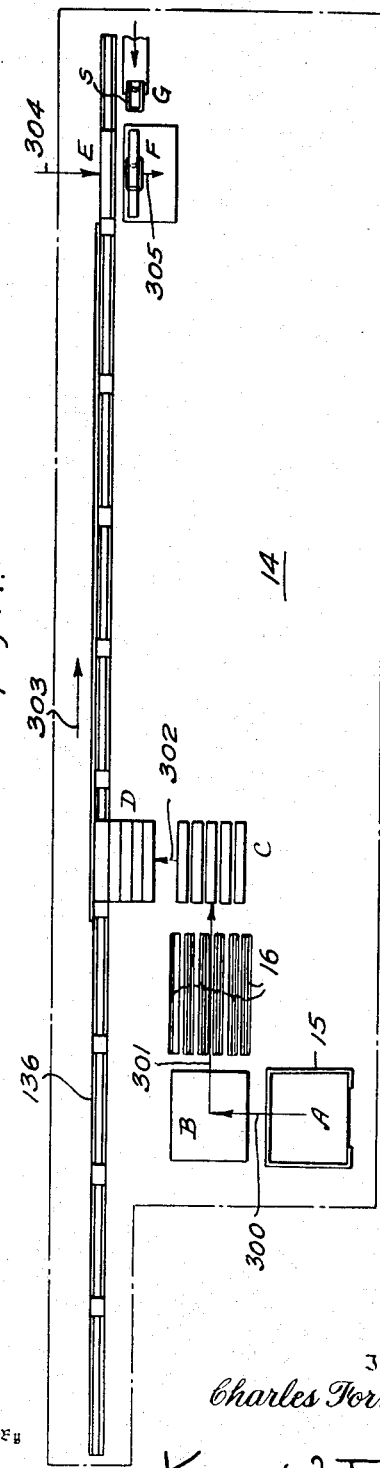
Inventor
Charles Forney,
Karl W. Flocks
Attorney May 22, 1956 C. FORNEY 2,746,491
MACHINE FOR PRODUCING CLOTHESPIN
Original Filed Feb. 25, 1948 17 Sheets-Sheet 12

Inventor
Charles Forney,

By KARL W. FLOCKS
Attorney

Inventor
Charles Forney,

KARL W. FLOCKS
Attorney

May 22, 1956

C. FORNEY 2,746,491

MACHINE FOR PRODUCING CLOTHESPIN

Original Filed Feb. 25, 1948

Inventor
Charles Forney,

By
KARL W. FLOCKS
Attorney

May 22, 1956     C. FORNEY     2,746,491

MACHINE FOR PRODUCING CLOTHESPIN

Original Filed Feb. 25, 1948     17 Sheets-Sheet 16

Inventor
Charles Forney,

By

KARL W. FLOCKS
Attorney

May 22, 1956 C. FORNEY 2,746,491
MACHINE FOR PRODUCING CLOTHESPIN
Original Filed Feb. 25, 1948 17 Sheets-Sheet 17

Inventor
Charles Forney,
By
KARL W. FLOCKS
Attorney

United States Patent Office 2,746,491
Patented May 22, 1956

2,746,491

MACHINE FOR PRODUCING CLOTHESPIN

Charles Forney, Norfolk, Va., assignor to The Diamond Match Company, New York, N. Y., a corporation of Delaware Original application February 25, 1948, Serial No. 10,855. Divided and this application July 25, 1952, Serial No. 300,863

19 Claims. (Cl. 140—1)

This invention relates to clothes pins and more particularly to the forming of spring sub-assemblies and assembling said sub-assemblies with clothes pin clamping members so as to form a completely assembled clothes pin comprising two clamping members and a spring.

This application is a division of copending application Serial No. 10,855, filed February 25, 1948, entitled "Production of Clothes Pins," which has matured into Patent No. 2,702,058.

Prior clothes pin machines, including U. S. Patent #1,830,021, granted November 3, 1931, to Charles Forney, did not include any mechanism for making the spring sub-assembly and as generally in accordance with the prior art it was required that these spring sub-assemblies be supplied from some outside source, whereas in accordance with the instant invention, the machine is supplied with spring wire in its basic form and the machine fabricates the spring sub-assembly and in timed relation effects the assembly with the remaining clothes pin parts to make up the finished clothes pin automatically.

It is an object of the instant invention to teach the automatic and substantially continuous manufacture and assembly of clothes pins comprising clamping members and a spring sub-assembly.

It is another object of the instant invention to position and move the various sub-assemblies of a multi-part clothes pin in timed relation so that final assembly is obtained automatically and substantially continuously.

Other objects and the nature and advantages of the instant invention will be apparent from the following description taken in conjunction with the accompanying drawings, wherein:

Fig. 6 is a view similar to Fig. 5 with the parts in a different position;

Fig. 7 is a section taken approximately on the line 15—15 of Fig. 4;

Fig. 8 is a view similar to Fig. 7 with the elements in a different operating position;

Fig. 9 is a partial view similar to Fig. 7 with the parts in a third position;

Fig. 10 is an enlarged sectional detail taken approximately on the line 18—18 of Fig. 11;

Fig. 11 is a section taken approximately on the line 19—19 of Fig. 3;

Fig. 13 is a perspective view of the guide plate;

Fig. 14 is a sectional detail of a portion of the machine similar in general to Fig. 6 with the parts in a different position;

Fig. 16 is a diagrammatic front elevation of the machine illustrating the various treatment steps;

Fig. 17 is a diagrammatic plan view illustrating the treatment steps;

Fig. 18 is a detail illustration of the cooperation of the spring and presser foot during partially advanced position;

Figure 33:
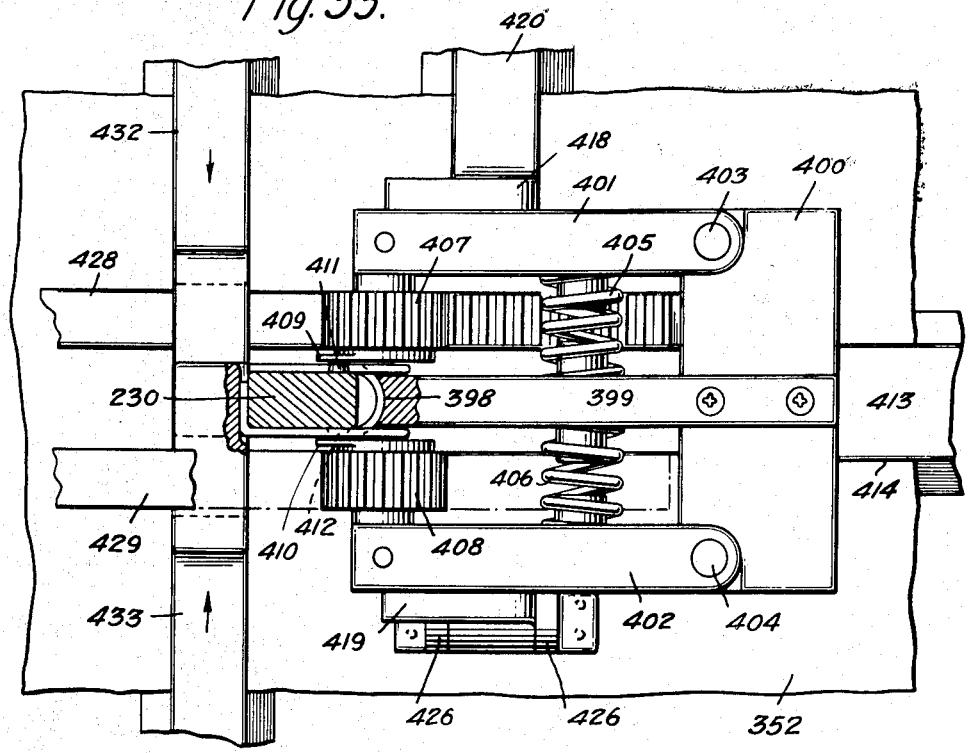
Figures 34, 35:
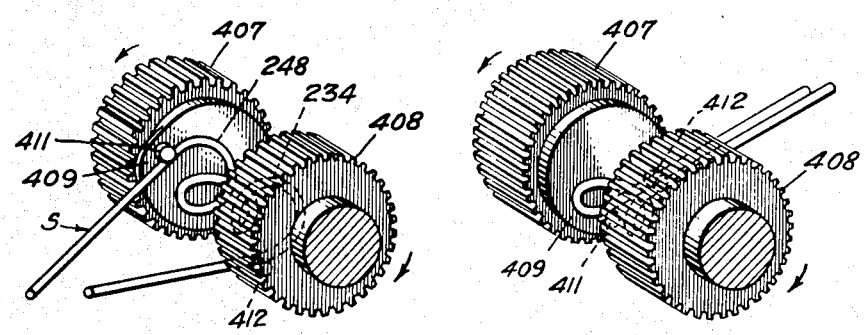
Figure 26:
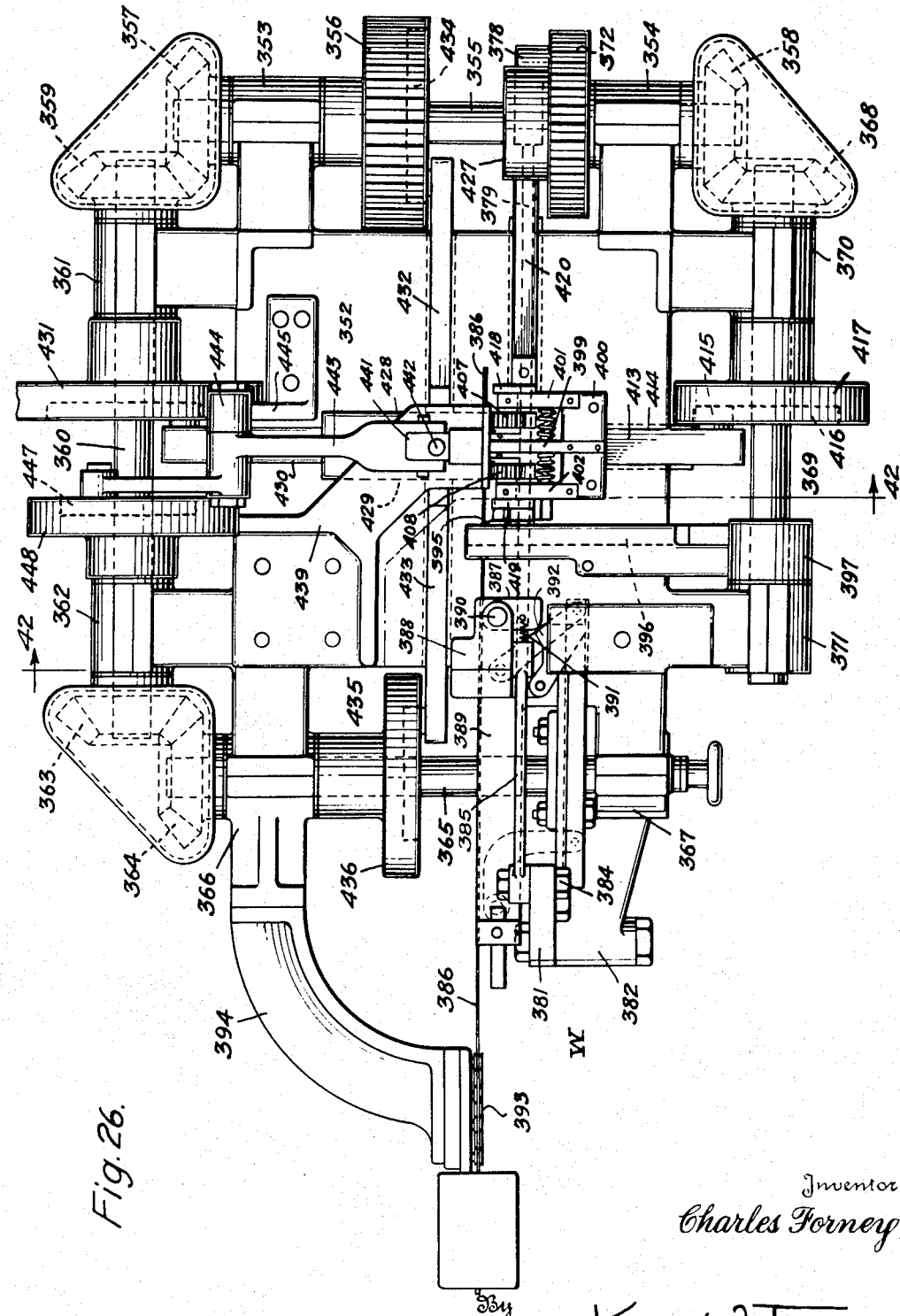
Figure 27:
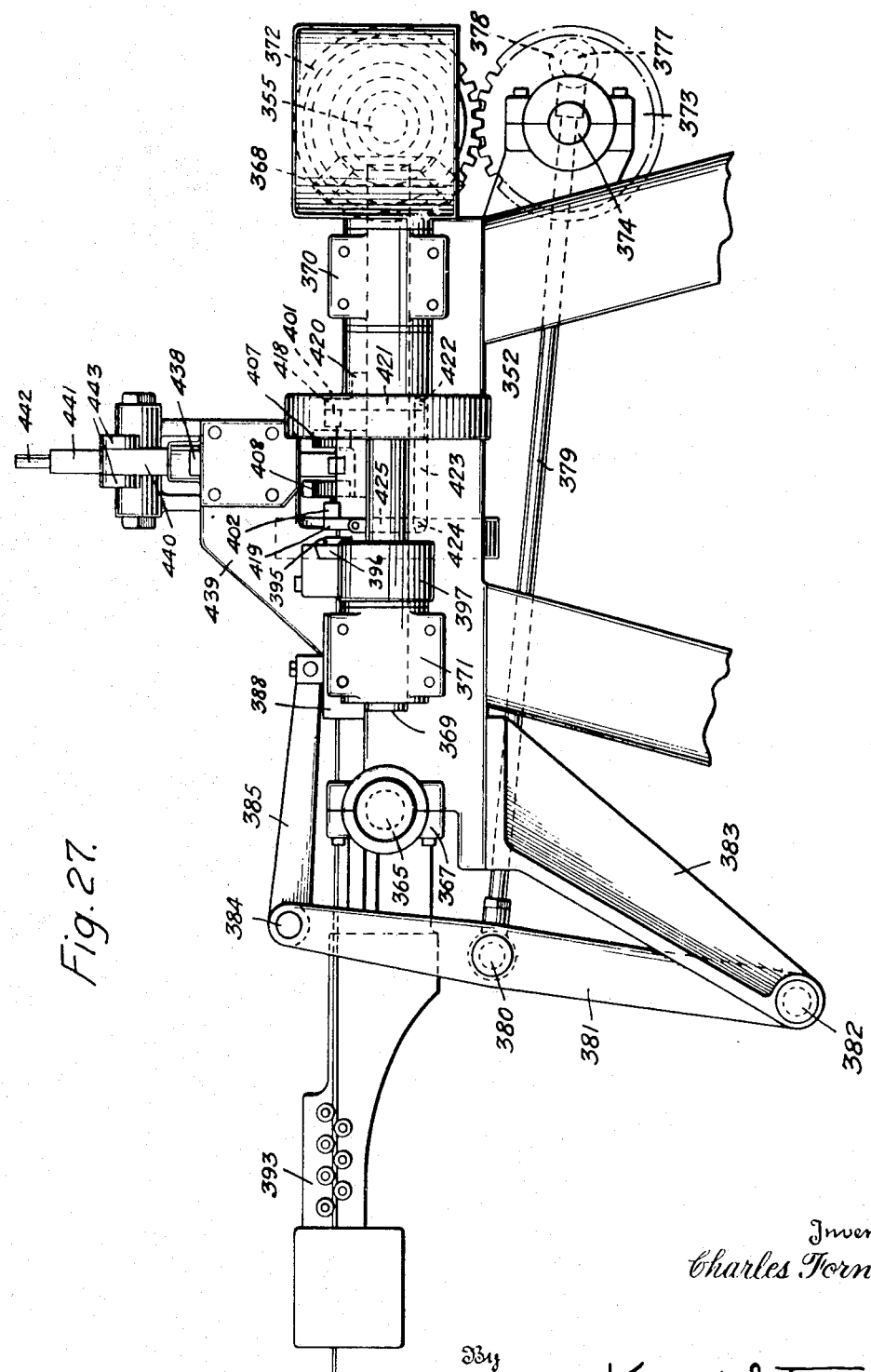
Figure 28:
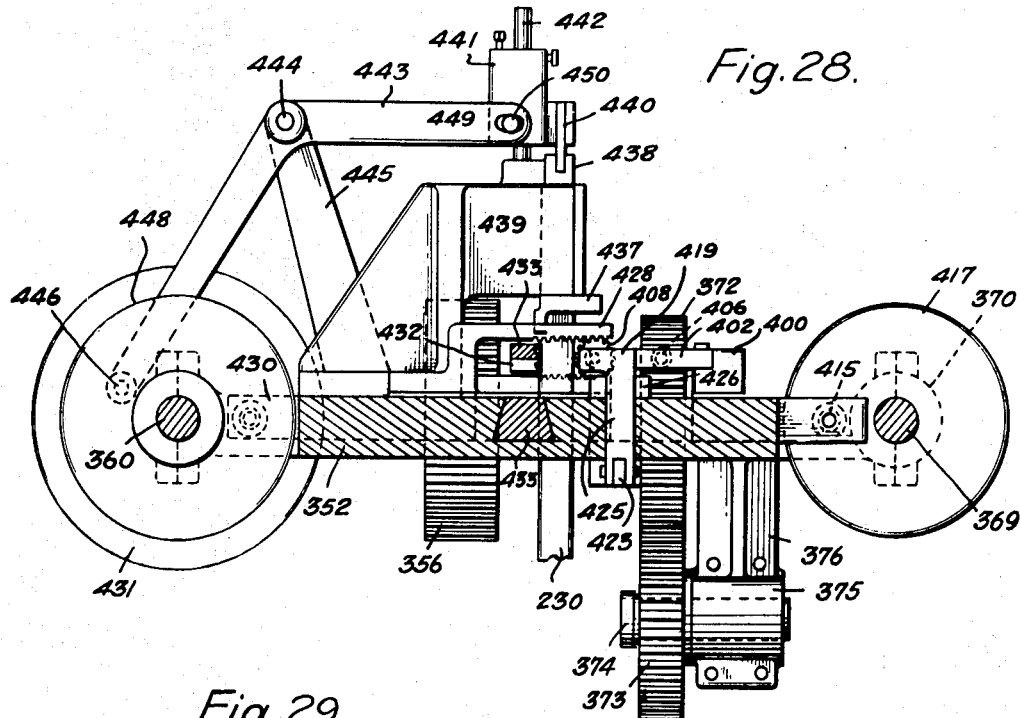
Figure 29:
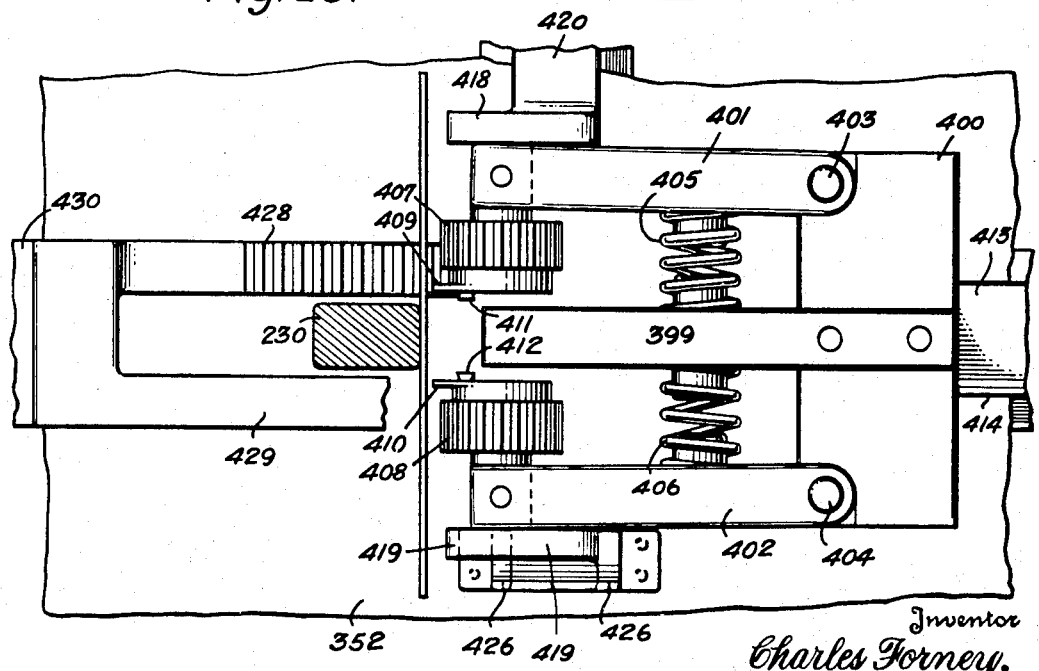
Figure 30:
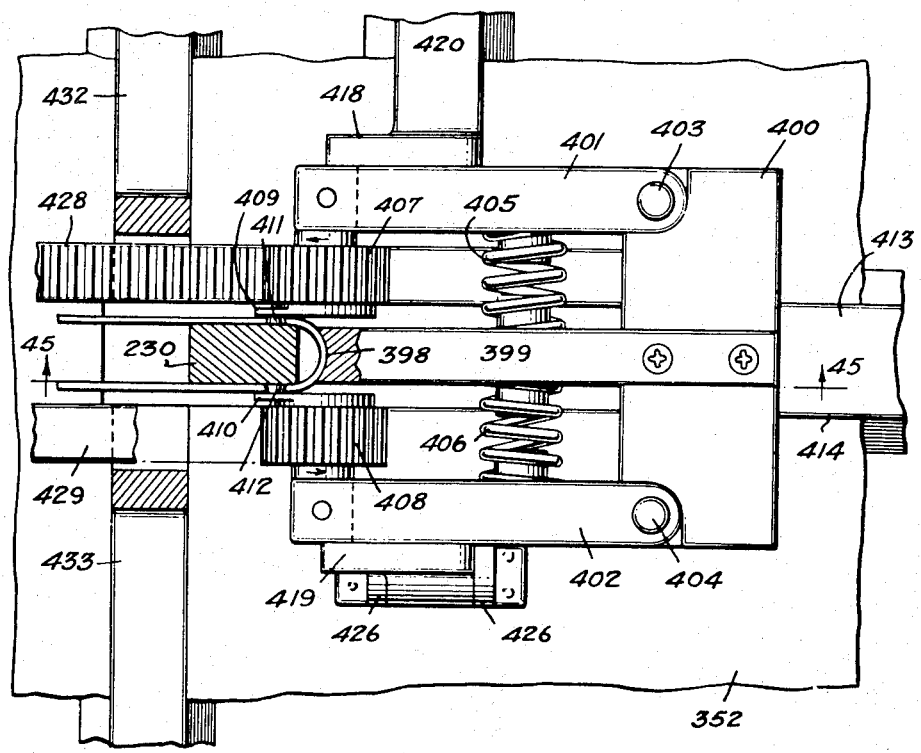
Figure 31:
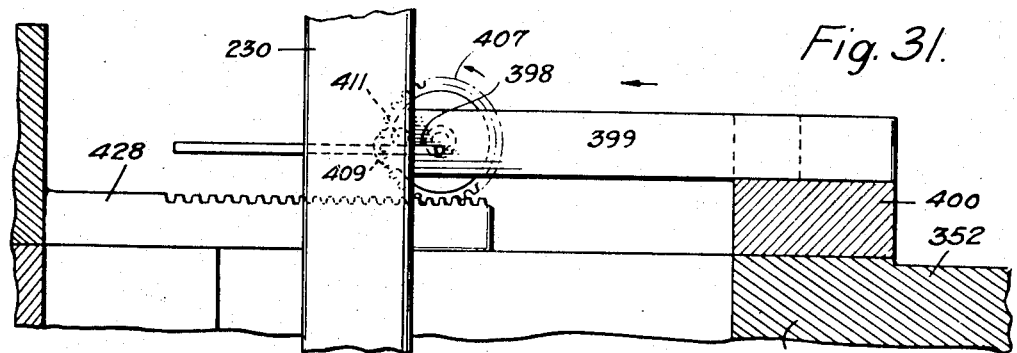
Figure 32:
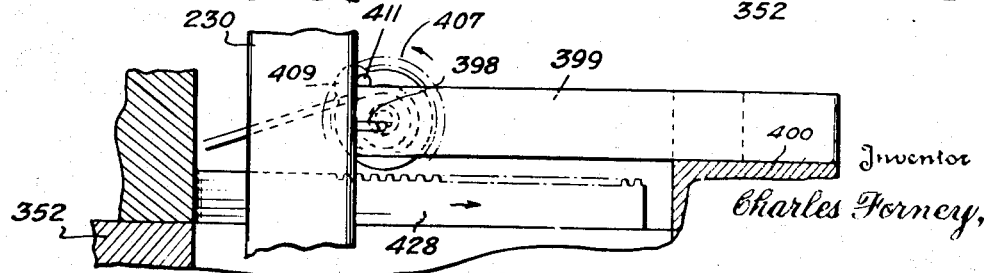

Figs. 20 to 25, inclusive, are diagrammatic illustrations of certain of the operating cycles;

Fig. 26 is a plan view of a portion of the machine incorporating the wire making apparatus;

Fig. 27 is a side elevation of the portion of the machine shown in Fig. 26;

Fig. 28 is a section taken generally along the line 42—42 of Fig. 26;

Fig. 29 is an enlarged detail of a portion of the machine showing the wire in position prior to bending;

Fig. 30 is a view similar to Fig. 29 with the parts in position after the first bending step;

Fig. 31 is a section taken on the line 45—45 of Fig. 30;

Fig. 32 is a view similar to Fig. 31 illustrating the parts of the apparatus towards the end of the bending operation;

Fig. 33 is a view similar to Figs. 29 and 30 illustrating the position of the parts after the final bending operation;

Fig. 34 is a diagrammatic illustration showing the bending gears and wire at an intermediate stage of bending; and Fig. 35 is a view similar to Fig. 34 illustrating the position of the bending gears during a stage of bending equivalent to that shown in Fig. 32.

Figure 1:
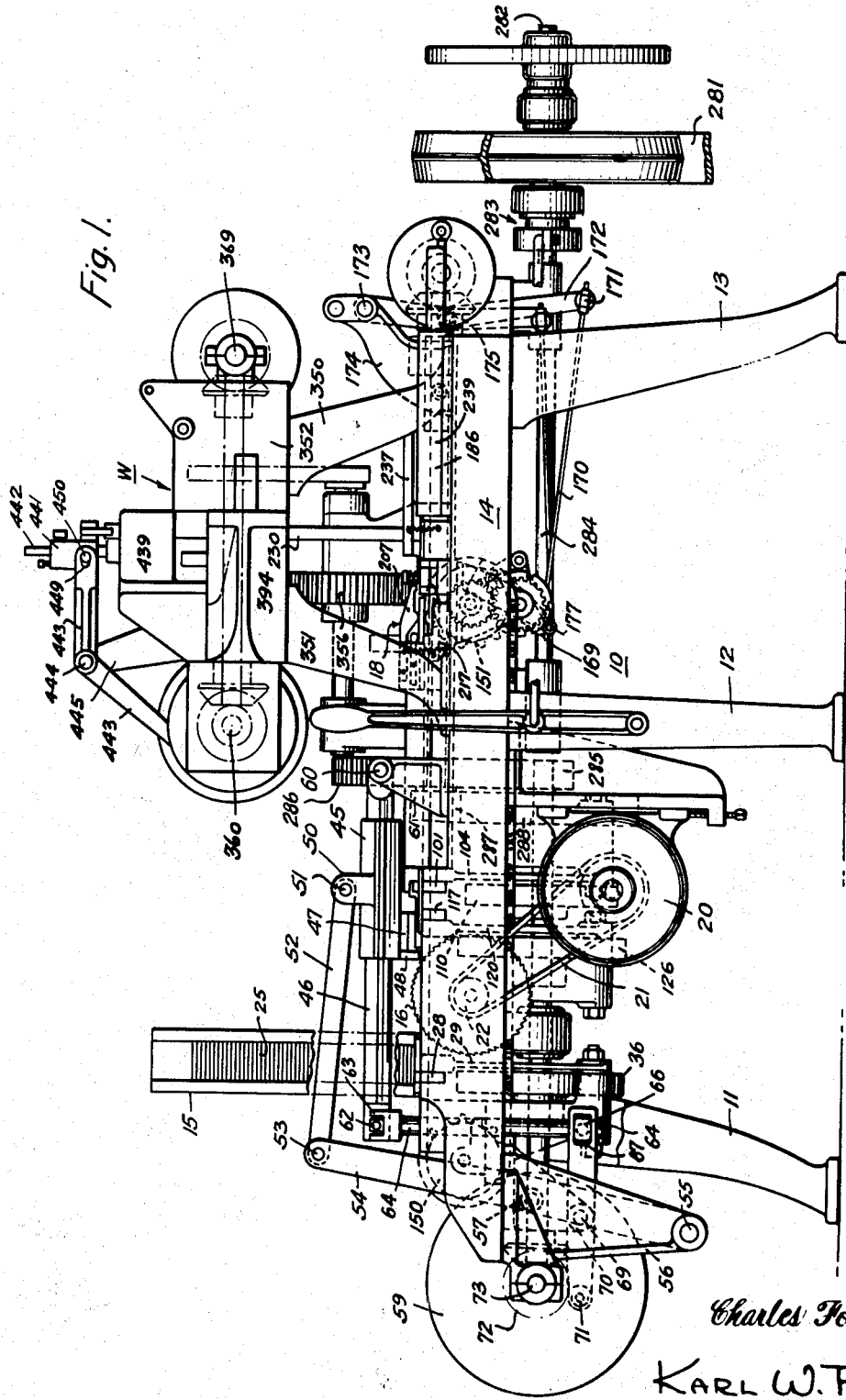
Fig. 1 is a side elevation of the apparatus in accordance with the present invention.

Referring to the drawings and particularly Fig. 1, the pin forming machine of the present invention is indicated in general at 10. The machine is supported by a plurality of legs 11, 12, and 13 which support a bed plate 14. Supported from the bed plate 14 is a magazine 15, a plurality of saws 16, the wire forming mechanism indicated in general at W and the wire and pin assembling mechanism indicated in general at 18. The machine also includes a plurality of transfer mechanisms for moving the blanks to the saws, moving the sawed pins to the wire and pin assembling mechanism and supplying spring wire at properly timed intervals to the pins, as will be hereinafter set forth in detail.

The pin feed and assembly

Figure 2:
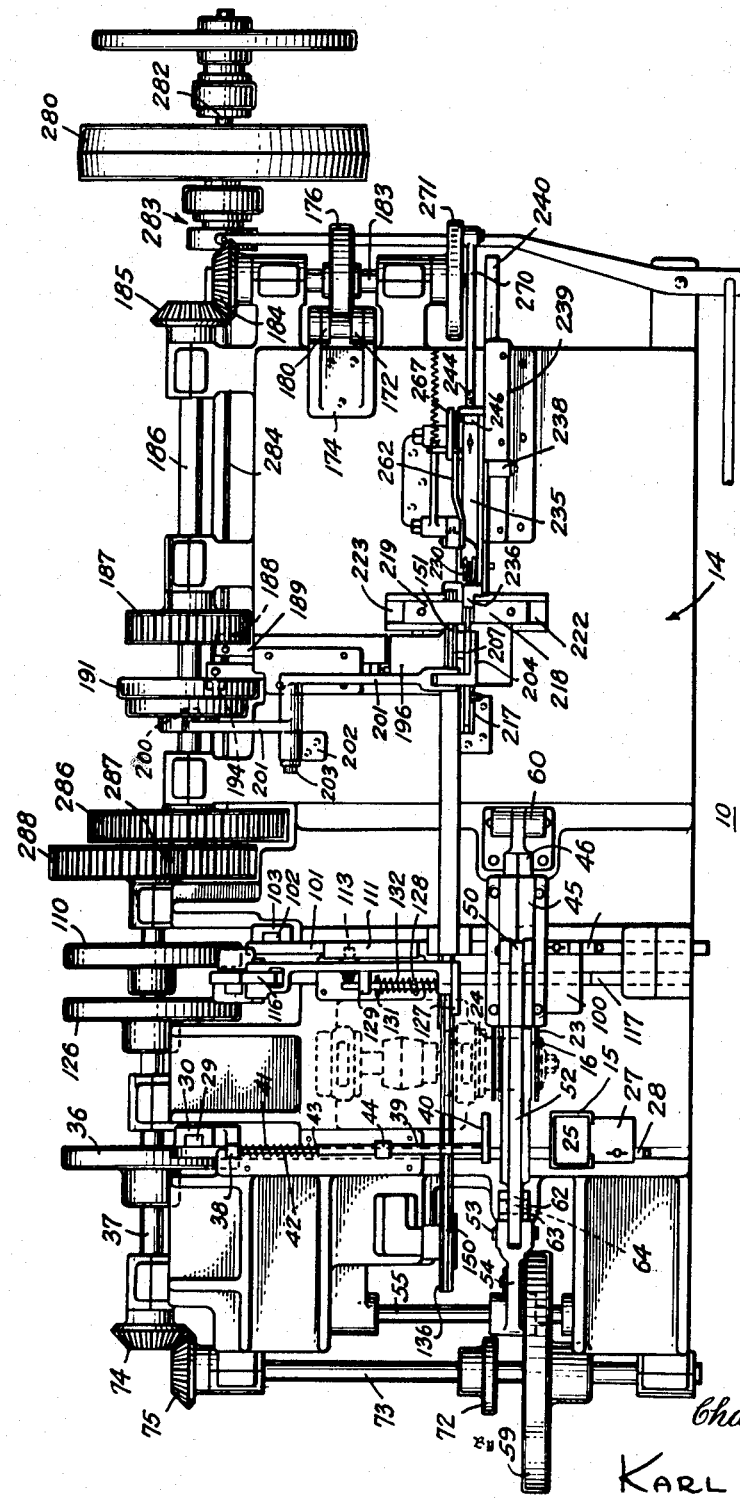
Fig. 2 is a plan view.
Figure 3:
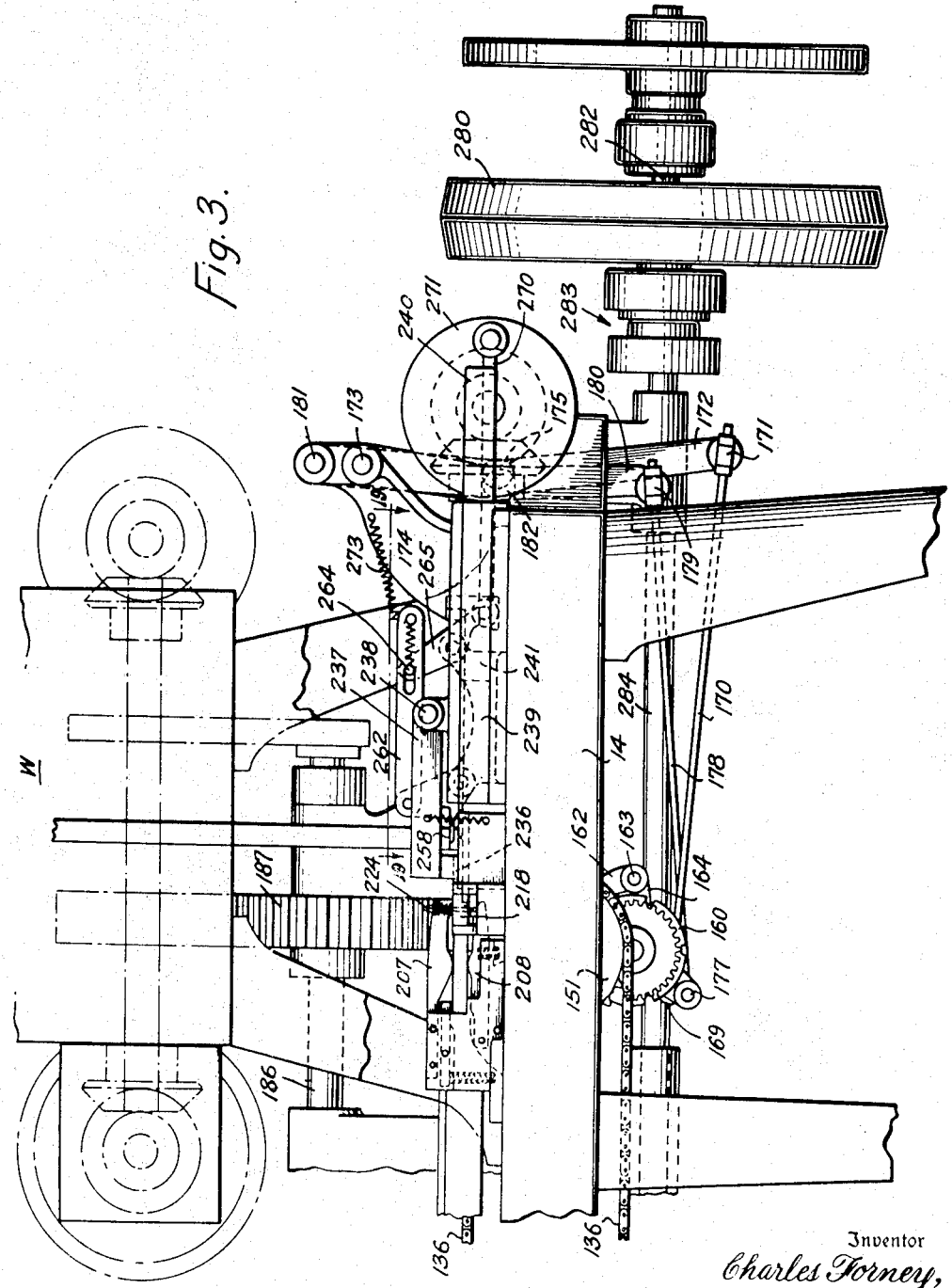
Fig. 3 is an enlarged side elevation of a portion of the machine.
Figure 5:
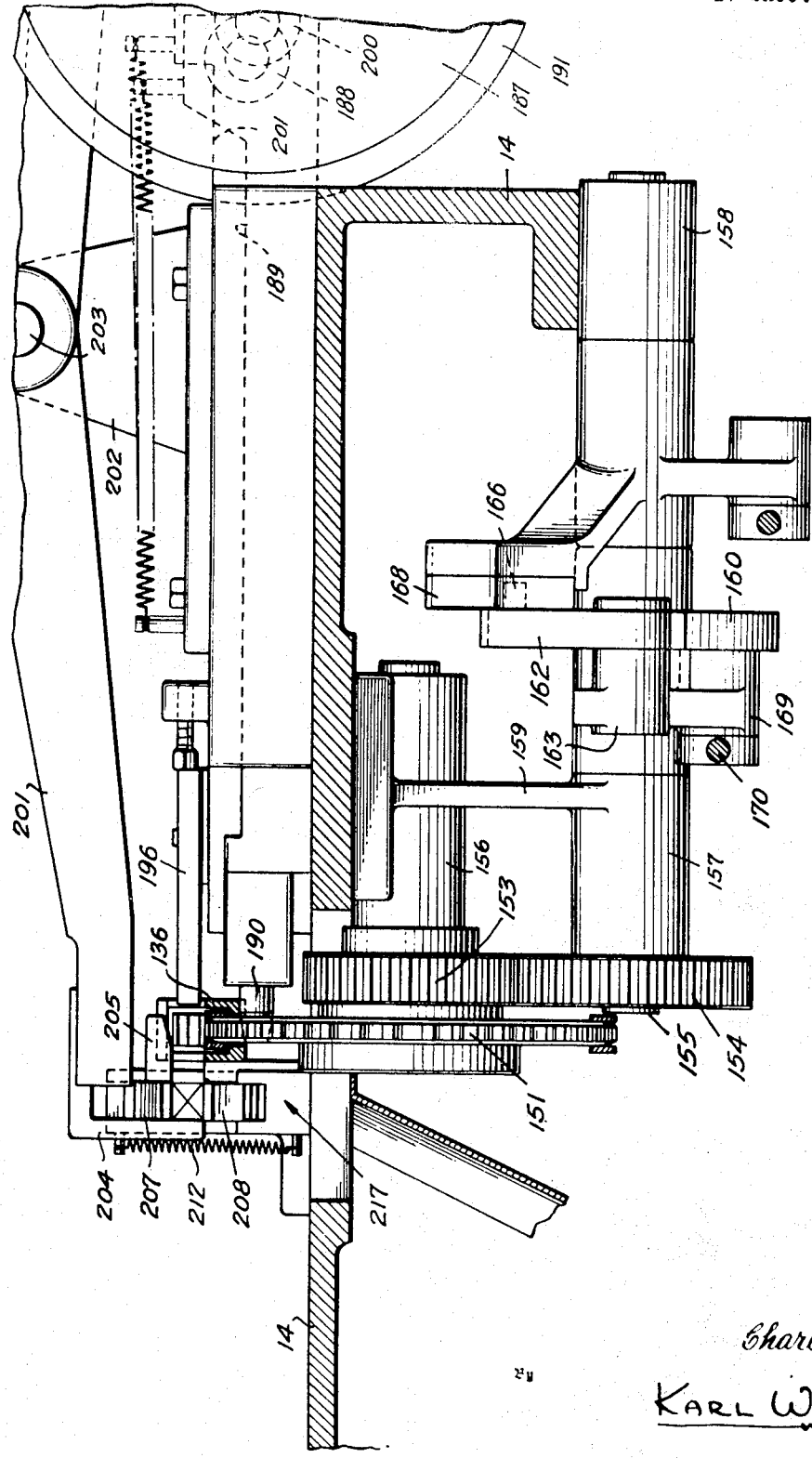
Fig. 5 is a section taken approximately on the line 13—13 of Fig. 4.

Referring to Figs. 1 and 2, it will be noted that the chain 136 is trained at one end over a sprocket 150 and at the other end over a sprocket 151. The sprocket 151 is best shown in Fig. 7 and as there shown is carried by a shaft 152. The shaft 152 carries a gear 153 which meshes with gear 154 mounted for rotation with the shaft 155. The shaft 152 is supported by the bearing 156, and the shaft 155, as best shown in Figs. 5 and 7, is supported by the bearings 157 and 158 carried by the hanger 159 and the bed plate 14, respectively. The shaft 155 also carries a ratchet 160 provided with ratchet teeth 161. A pawl 162 is provided pivoted at 163 to the bell crank lever 164 which is pivoted on the shaft 155. The pawl 162 is provided with a nose 165 which fits between the teeth 161. The pawl 162 also carries a pin 166 which fits within a cam slot 167 in a cam lever 168. The cam lever 168 is also pivoted on the shaft 155. The end of the bell crank lever 164 remote from the pivot 163 is pivoted at 169 to a rod 170 which is connected at its other end as at 171 to a lever 172 pivoted at 173 to a standard 174. The intermediate portion lever 172 is provided with a roller 175 operating in a suitable cam slot in the cam 176. The cam lever 168 is similarly pivotally connected as at 177 to one end of a rod 178 which is connected at its other end as at 179 to a lever 180 which is also pivotally supported by the standard 174 at 181 (see Fig. 3). The lever 180 also carries a roller 182 which cooperates with a second suitable cam slot in the cam 176. The cam 176 is mounted for rotation with the right-hand lateral drive shaft 183. The shaft 183 is driven by means of the bevel gears 184 and 185 from the shaft 186. The shaft 186 is provided with a cam gear 187 which serves to drive a wire bending mechanism illustrated in general at W. In addition, the gear 187 is provided with a cam slot on its face which cooperates with a pin 188 on a slide 189. The end of the slide 189 carries a pin 190 which fits into a suitable opening in the sprocket wheel 156 so that as the chain has carried a pin assembly into proper position the chain is stopped in this position until the pin 190 is withdrawn, as shown in Fig. 14. The shaft 186 also carries a cam 191 for rotation therewith provided with a pair of cam slots 192 and 193 on each face thereof. The slot 192 cooperates with the pin 194 carried on a slide 195 which carries on its end remote from the pin 194 a pin contacting transfer plate 196. The transfer plate is connected to the slide in a manner similar to the transfer plate 27 so that it will be capable of adjustment.

The cam slot 193 cooperates with a pin 200 which is carried on a rocker arm 201 pivoted to the standard 202 at 203. The rocker arm 201 carries at its end remote from the pin 200 a depending finger 204 which functions as a stop for the pin assembly when it is moved from the chain into assembly position, as shown in Fig. 5.

Figure 4:
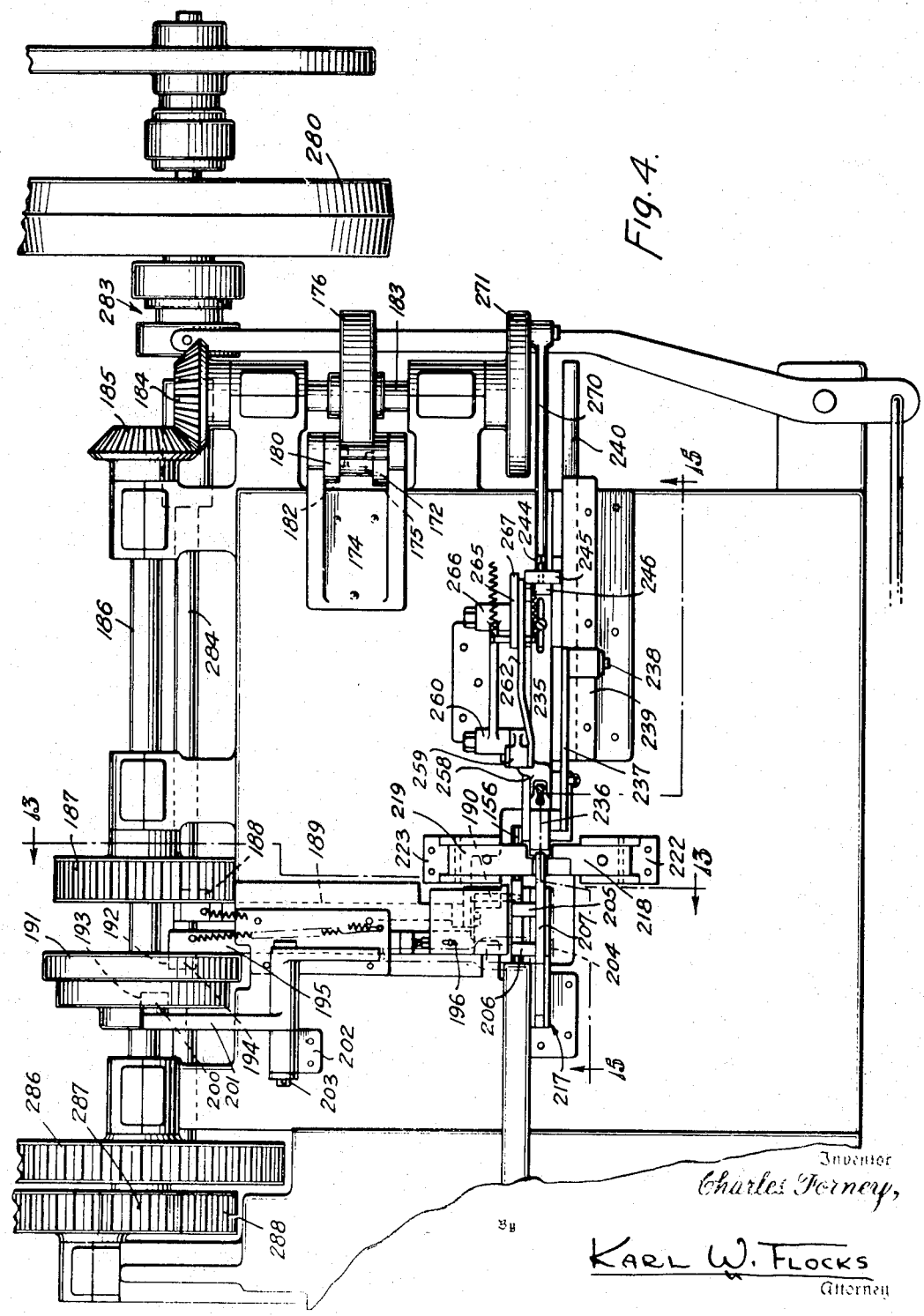
Fig. 4 is a plan view of the portion of the machine shown in Fig. 3.

As best shown in Figs. 4 and 6, when the plate 196 moves the pin assembly, it is guided by the cam fingers 206 and 205 into position between the jaws 207 and 208 at its rearward end and beneath the jaw clamp 209 at its forward end; the lower forward end of the pin being supported on the fixed ledge 210. The jaw 208 is urged upwardly by the spring 211 and the jaw 207 is urged downwardly by the spring 212. Similarly, the clamp 209 is urged downwardly by the spring 213 which pushes upwardly on the rearward end of the clamp 209 beyond the pivot 214.

It is to be noted that the clamp members 207 and 208 are pivoted at 215 and 216, respectively, within the supporting member indicated in general at 217. As the pin assembly is moved into the position just described, it is also moved between the spring spreader members 218 and 219. As best shown in Figs. 10 and 11, the spring spreader members 218 and 219 are pivoted at 220 and 221, respectively, to supporting blocks 222 and 223, respectively. The spreaders 218 and 219 are also urged towards each other by the springs 224 and 225.

Referring to Fig. 7, the pin assembly is shown in position and a single spring indicated in general at S has just been fed to the machine down the post 230. At the lower end of the post the spring is positioned upon a guide plate 231 provided with grooves 232 and 233 (Fig. 13). As shown in Figs. 7 and 18, one of the coils 234 is within the long groove 232. A push rod 235 is reciprocated to move the spring along the guide plate 231 and under the presser foot 236. The presser foot 236 is carried by the arm 237 which is pivoted at 238 to the guide casting 239. Mounted within the guide casting 239 for slidable movement is a slide 240 which in turn carries a block 241 which has adjustably affixed thereto the rod 235. As best shown in Fig. 4, the rod 235 is provided with a slot 242 therein and a lock screw 243 projects into the slot from the block 241 (Fig. 11). Adjustment of the rod 235 is effected by moving the adjustment bolt 244 threaded within the ear 245 which is carried by the block 241, the bolt 244 bearing against an ear 246 on the rod 235. The presser foot 236 is urged downwardly by a spring 247 so that as the push rod 235 moves the spring S towards the spreaders 218 and 219, the spring is held against the guide plate 231, as best shown in Fig. 7. During this movement one coil 234 of the spring is initially engaged within the long groove 232 and as the spring is moved under the presser foot 236 the other coil 248 is moved into the shorter groove 243.

Figure 19:
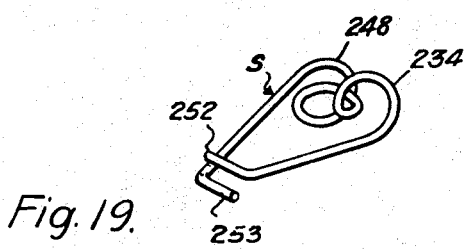
Fig. 19 is a detail view of the spring prior to assembly with the pin.

As soon as the spring which, as best shown in Fig. 19, extends downwardly to a greater extent at the coil 234 than at the other coil 248, enters the short groove 233, proper alignment is insured as it is moved under the presser foot. Further movement of the spring into the position shown in Fig. 8 initiates the expansion of the spring as the convolutions of the spring are forced up the inclined faces 250 and 251 (Fig. 8). As the end of the rod approaches the spreaders 218 and 219, the spreaders are moved apart and further movement of the spring by the push rod will snap the tails 252 and 253 of the springs into position in the grooves 254 and 255 of the pin (Fig. 9). It will be noted that the spring spreaders 218 and 219 are provided with rearwardly extending tails 256 and 257 which overhang the ends of the pin and insure the passage of the tails 252 and 253 of the spring onto the pin.

It will be noted that the present device is also provided with an additional presser foot 258 which is carried by an arm 259 which is pivoted at 260. The arm 259 is pivotally connected at 261 to a link 262 which is connected by the slot 263 and pin 264 to the lever 265. The lever 265 is pivotally supported at 266 and is provided with a tail 267.

Figure 12:
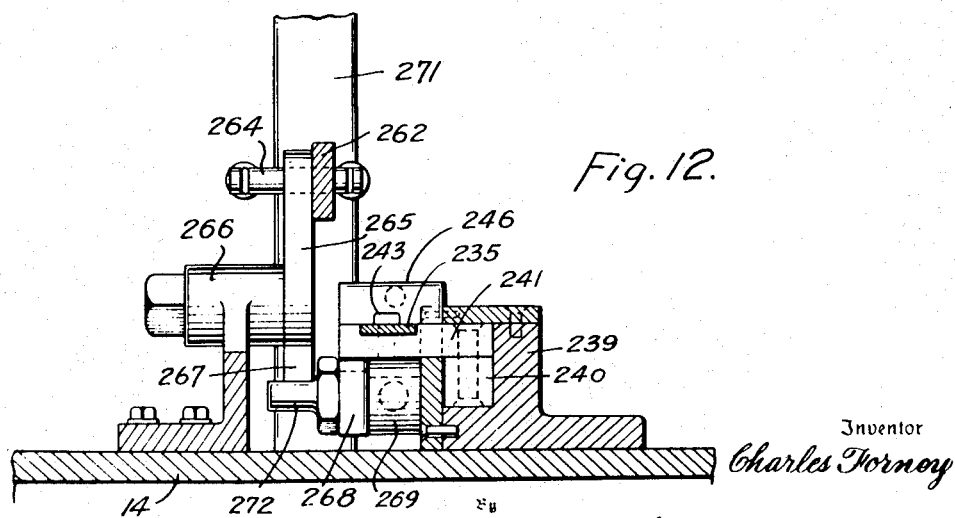
Fig. 12 is a section taken approximately on the line 20—20 of Fig. 11.

The rod 235, as previously described, is adjustably carried by the block 241 which in turn is riveted to the slide 240. The block 241 is provided with a downwardly depending lug or ear 268 which receives a pivot pin 269 pivotally connected to the rod 270 which is reciprocated by the eccentric 271. The pivot pin 269 is provided with a projection 272 which, as shown in Figs. 7 and 12, supports the tail 267 and the lever 265 and at this time forces the presser foot 258 against the spring S. When the rod 235 is in a forward position, as shown in Fig. 8, the pin has moved beyond the tail 267 and allowed the tail to drop so that the presser foot is lifted upwardly allowing a spring S' to drop in the position to be fed. The spring 273 serves to actuate the presser foot and accompanying lever structure.

The drive mechanism

Referring to Fig. 4, the main drive pulley for the machine is indicated at 280. This is suitably driven as by a belt 281 from a motor (not shown).

The drive pulley 280 rotates a shaft 282 which drives a clutch indicated in general at 283 which in turn drives a lower drive shaft 284. The drive shaft 284 rotates a pinion 285 (Fig. 1) which drives a gear 286 rotatable with the drive shaft 186, previously described.

Figure 15:
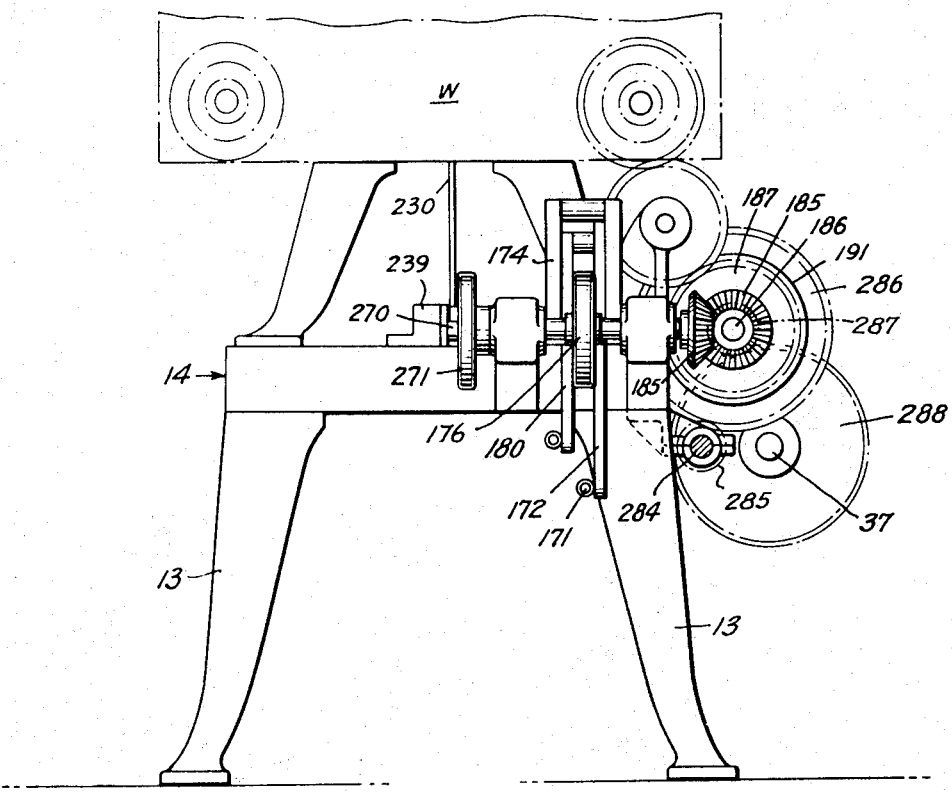
Fig. 15 is an end elevation of the machine showing a portion of the drive.

A second pinion 287 rotatable with the gear 286 drives the gear 288 which in turn drives the shaft 37, previously described. On the shaft 186 there is provided a cam gear 187, previously described, which serves to drive the wire forming mechanism so that the wire forming mechanism provides the springs S in timed relation and proper coordination with the pin assembly supplying means (see also Fig. 15).

The shaft 37 drives the shaft 73 through the bevel gears 74 and 75. Similarly, the shaft 186 drives the shaft 183 through the bevel gears 185 and 184.

The shaft 73 drives the cam 59 which serves to operate the slide 45 for moving the blanks longitudinally of the table 14 and through the saws. The cam 72 serves to lift and lower rail 46 through the rod 64 so as to lift and lower the push plate 48. The shaft 37 drives the cams 36, 126 and 110, the cam 36 serving to operate the transfer mechanism pin including the pin blank contacting portions 27 and 40. This serves to move the blanks from the magazine 15 into the path of the pusher member for movement through the saw. The cams 126 and 110, as previously described, operate the transfer mechanism for moving the sawn blanks transversely of the table 14 and feeds these blanks to the conveyor 136. The conveyor 136 moves the pin assemblied in separated relation to the assembling mechanism to the assembly point where they are assembled with the springs as just previously described.

The wire bending mechanism

The wire bending mechanism W is supported upon the bed plate 14 by a plurality of legs of which two are shown in Fig. 1 and indicated at 350 and 351. The legs serve to support a bed plate 352 which in turn carries a plurality of bearings of which the bearings 353 and 354 serve to support for rotation a main drive shaft 355 which carries a drive gear 356 which meshes with and is driven by the gear 187 on the drive shaft 186 so that the wire bending mechanism is driven in synchronism with the remainder of the machine. The main drive shaft for the wire bending mechanism 355 is provided at each end with a bevel gear, these gears being indicated by the reference numerals 357 and 358. The bevel gear 357 meshes with and drives a bevel gear 359 supported by and rotatable with a shaft 360 which is supported by the bearings 361 and 362 from bed plate 352. The shaft 360 carries at its end remote from the bevel gear 359 a second bevel gear 363 which meshes with and drives a bevel gear 364 which in turn drives the shaft 365 supported from the bed plate 352 by bearings 366 and 367. The second bevel gear 358 upon the main drive shaft 355 meshes with and drives a bevel gear 368 which in turn rotates a shaft 369 supported by the bearings 370 and 371 from the bed plate 352.

The main drive shaft 355 is provided with a feeder drive gear 372 which is rotatable with the drive shaft (see Fig. 27). The feeder drive gear 372 meshes with and drives a gear 373 carried upon a stub shaft 374 which is rotatable in and supported by the bearing 375 supported by the hanger 376 from the bed plate 352. Extending from the face of the gear 373 is a pivot pin 377 having journalled thereabout a collar 378 attached to the rod 379 so that upon movement of the gear 373 the rod is given a reciprocating movement. The rod 379 is pivoted as by the pivot 380 to the lever 381 which is pivotally supported at 382 from the arm 383, in turn supported by the bed plate 352. The end of the lever 381 remote from the pivot 382 is pivotally connected at 384 to the rod 385. The rod 385 serves to move a friction feeding device for feeding the wire 386. The friction feeding mechanism includes a wire gripping dog 387 which, aided by the jaw 388, serves to grip the wire upon forward movement along the guideway 389. The dog 387 is pivoted on the pivot 390 and is urged by the spring 391 out of gripping position and during rearward movement of the friction feeding mechanism, the dog is permitted to pivot clockwise about the pivot 390 to release the wire. Upon forward movement, however, the dog 387 is urged into wire gripping position by the action of the nose 392.

During the feeding movement the wire is kept under tension and straightened by the wire straightening rolls indicated at 393. These rolls are suitably supported by the arm 394. After a suitable length of wire is fed at each forward movement, the wire is cut by a sliding knife 395 mounted upon a block 396 and driven from a cut-off cam 397 which is mounted for rotation with the shaft 369. The forward portion of the wire 386 just prior to being cut off is positioned in the slot 398 formed in the bar 399 carried by the cross-head 400. The cross-head 400 also supports a pair of arms 401 and 402 pivoted to the cross-head on the pivots 403 and 404, respectively, and urged outwardly by the springs 405 and 406. The ends of the arms 401 and 402 each pivotally support the gears 407 and 408, respectively, these gears being provided with cam faces 409 and 410 and with bending pins 411 and 412.

The cross-head 400 is mounted on the slide 413 which is slidably mounted within a groove 414 in the bed plate 352. The slide 413 is provided with a pin 415 which cooperates with a groove 416 in the cam 417 mounted for rotation with the shaft 369. Gears 407 and 408, as previously described, are urged outwardly by the springs 405 and 406. This outward and inward movement of the gears 407 and 408 is necessary in order to permit the release of the wire in final bent form, as will be hereinafter set forth. An additional movement, however, of the slide 413 toward the wire will move the gears and the cam faces 409 and 410 and bend the wire into the position shown in Fig. 30, at which time the gears will also move inwardly against the force of the springs 405 and 406. This movement is effected by the push members 418 and 419. The member 418 is mounted upon a slide 420 which is slidably mounted in a guide groove within the surface of the bed plate 352. The push member 418 is provided with a downwardly extending tail 421 which is pivotally connected at 422 to a link 423 in turn pivotally connected at 424 to the tail 425 of the push member 419. The push member 419 is pivotally mounted at 426 between ears which extend upwardly from the bed plate 352. Movement of the slide 420 to the left, as shown, for example, in Fig. 27, will correspondingly move the push member 418 to the left and the push member 419 to the right thus moving the gears 407 and 408 inwardly.

Forward movement of the slide 413 will carry the pins 411 and 412 into engagement with the wire in the position shown in Figs. 30, 31 and 32. The slide 420 is moved by a cam 427 which is mounted to rotate with the gear 372. The lower portion of the gear 407 meshes with the rack 428 and the top of the gear 408 meshes with the rack 429. The racks 428 and 429 are carried by the slide 430 which is mounted for sliding movement within a groove in the bed plate 352 and is driven by the cam 431 mounted to rotate with the shaft 369. Movement of the slide 430 to the right as shown in Fig. 29 will rotate the gear 407 counterclockwise and the gear 408 clockwise, correspondingly moving the pins 411 and 412. Thus, the continued rotation of the pins will bend the wire so that it is provided with a pair of spiral portions or coils 234 and 248, best shown in Fig. 19 and previously described. Successive steps in the spiral-forming operation are illustrated by Figs. 29 and 30 and the diagrammatic views 34 and 35.

After the spiral is formed, as shown in Figs. 35 and 26, a pair of tails 252 and 253 are formed at the free ends of the wire by the slides 432 and 433. The slide 432 is moved inwardly to perform the bending operation by the cam groove 434 formed within the drive gear 356 and the slide 433 is moved by the cam groove 435 within the cam 436 which is mounted to rotate with the shaft 365. After the spring is formed, as shown in Fig. 33, about post 230, the gears 407 and 408 are released by the pusher members 418 and 419 and are permitted to move outwardly under the influence of springs 405 and 406. Thereafter, the retracting movement of the cross-head 400 moves the groove 398 away from the finished spring so that the spring is now free to slide down the post for assembly with the remainder of the clothes pin. This feeding movement of the spring is insured by the action of the stripper nose 437 which is moved downwardly at this time by the slide 438 journalled in the standard 439. The slide 438 is moved by the link 440, carried by the head 441 which is slidably movable upon the rod 442. The head 441 is moved by the bell-crank lever 443 which is pivotally mounted at 444 upon the standard 445 and is provided with a pin 446 which moves in a cam groove 447 within the cam 448 which is rotatable with the shaft 360. The bell-crank lever 443 is connected to the head 441 as by the slot 449 and pin 450 (see Fig. 28).

Operation

Referring now to Figs. 16 and 17, the path of the blanks and the assembly thereof with the pins is diagrammatically shown. The magazine 15 is indicated as Station A. As shown by the arrow 300, the blanks are moved transversely of the table 14 to the station indicated at B in alignment with the saws 16. As indicated by the arrow 301, from Station B the blanks are moved through the saw in parallel with the longitudinal axis of the table 14 to saws 16 and the blanks are moved as indicated by the arrow 302 to a position adjacent the conveyor indicated at D. The conveyor 136 carries the blanks in end-to-end separated relation longitudinally of the table 14 as indicated by the arrow 303 to Station E where they are then moved transversely of the table as indicated by the arrow 304 to Station F where they are clamped in position while the springs S are fed thereon from Station G, these springs being supplied in timed relation by the wire making machine W, as previously described. From the Station F, the assembled clothes pins are discharged, as indicated by the arrow 305.

Figure 20:
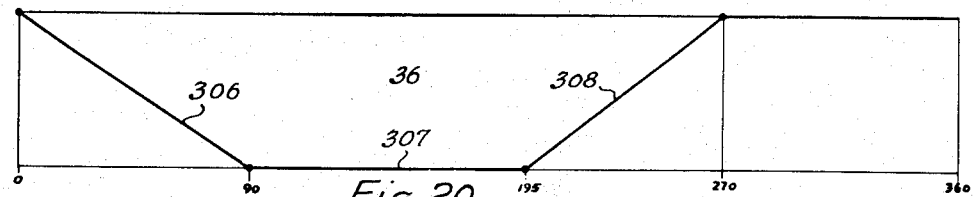

Referring now to Figs. 20 to 25, inclusive, the action of the first transfer mechanism 36 is indicated in Fig. 20 with relation to a 350 degree revolution of the drive shaft 37 or any of the other shafts driven from the main drive shaft 282. The portion of the diagram indicated at 306 illustrates forward movement of the blank from the magazine, i. e. from the Station A to Station B in Fig. 17. During the portion of the diagram indicated at 307, the first transfer mechanism is stationary so that the blanks may be moved from Station B through the saws 16 and the portion of the diagram indicated at 308 illustrates the return movement of the transfer mechanism, all of these movements being effected by the cam 36.

Figure 21:
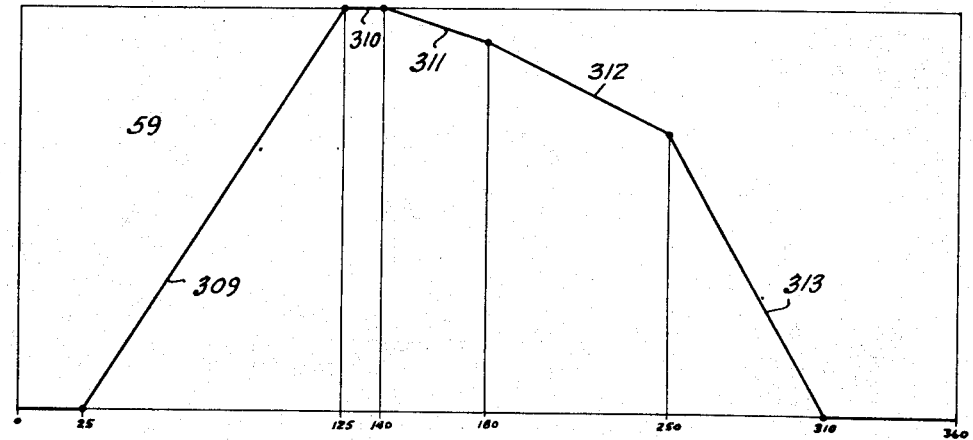

Referring to Fig. 21, this figure illustrates the movement produced by the cam 59 upon the push plate 48. As shown at 25, the portion of the diagram indicated at 309 illustrates the return of the push member to pick up a blank. The portion of the diagram indicated at 310 is a rest period prior to movement of the push member towards and through the saws as indicated by the portion of the diagram 311, 312, and 313.

Figure 22:
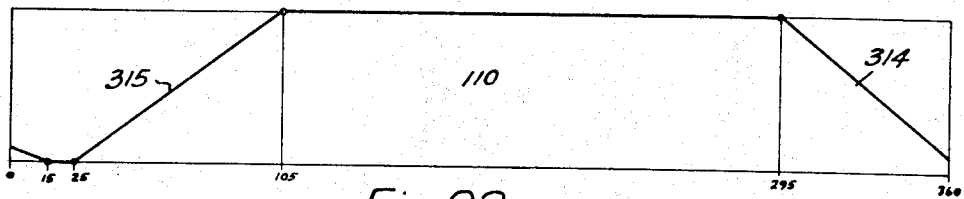

Fig. 22 illustrates the movement produced by the cam, effective to move the sawn blanks from Station C to Station D. The feed movement is indicated at 314 and the return movement at 315. This diagram in particular refers to the movement of the first feed member, i. e. the slide 101 and the pin blank contacting portion 100.

Figure 23:
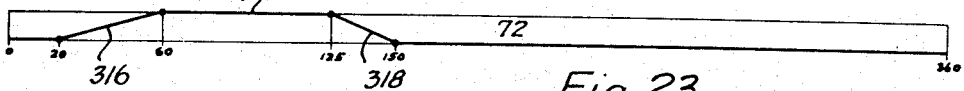

Fig. 23 illustrates the lifting and lowering of the saw feed slide, i. e. the movement of the guide rail 46. As shown, the guide rail is lifted during the portion of the diagram indicated by the reference character 316, and is retained in lifted position during the portion of the diagram indicated at 317, and finally lowered as indicated by the portion of the diagram 318.

Figure 24:
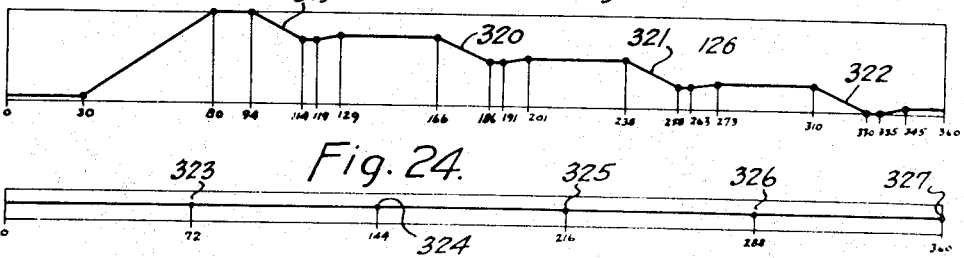

Fig. 24 illustrates the movement of the feed mechanism which is effective to intermittently feed the sawn blanks to the convey, i. e. the finger 127. As shown, this action is produced by the cam 126 and includes a plurality of feeding movements, indicated at 319, 320, 321, and 322. It will be noted that there are four of these feeding movements, the first pin being fed directly to the conveyor by the movement of the pin blank contacting portion 100 which has just been referred to in connection with Fig. 22.

Figure 25:
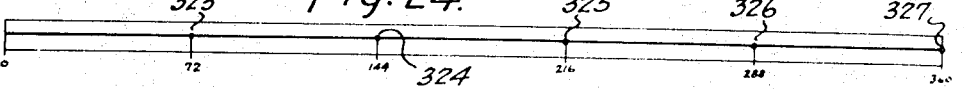

Fig. 25 illustrates the movements of the conveyor chain 136 which is just stopped at the points 323, 324, 325, 326 and 327 in order to permit feed of the pins thereto. It is to be understood that the chain does not partake of another movement until after the pins have been fed to the chain.

It will be obvious to those skilled in the art that various changes may be made without departing from the spirit of the invention and, therefore, the invention is not limited to what is shown in the drawings and described in the specification but only as indicated in the appended claims.

What is claimed is:

1. In a machine for the assembly of three-part clothespins of the character comprising a pair of clamping members connected by a spring structure which structure includes a pair of laterally spaced convolutions arranged in substantially parallel planes, said machine comprising a frame, means mounted on said frame for retaining said clamping members in fixed position, means positioned adjacent said retaining means for slidably feeding and assembling said spring structure with the clamping members, and means associated with said feeding and assembling means for receiving a portion of said convolutions and guiding same in slidable relation during feeding movement and for aligning said convolutions with the fixed position of said clamping members.

2. The structure recited in claim 1, said receiving means including a pair of guide grooves spaced from one another a distance equal to the space between said convolutions for receiving a portion of said convolutions during feeding movement, said guide grooves being aligned with the fixed position of said clamping members.

3. The structure recited in claim 2, the convolutions of said spring structure being arranged in substantially parallel planes and when the spring structure is so held that the said planes are substantially vertical, the distance from the geometric center of one of said convolutions to the bottom thereof is greater than the corresponding distance on the second of said convolutions, one of said guide grooves being longer than the other of said grooves, means mounted on said frame for transferring spring structures to said receiving means, one end of the longest guide groove being positioned below said transfer means to receive the convolution of a spring structure wherein the distance from the geometric center to the bottom thereof measured in a vertical plane is greater.

4. In a machine for the assembly of three-part clothespins of the character comprising a pair of clamping members connected by a spring structure which structure includes a pair of laterally spaced convolutions arranged in substantially parallel planes, said machine comprising a frame, means mounted on said frame for retaining said clamping members in fixed position, said retaining means including a fixed seat for receiving a portion of one of said clamping members, a spring pressed jaw cooperating with the fixed seat and engaging said clamping member for holding said clamping members in fixed position, means mounted on said frame for feeding and assembling said spring with the clamping members, and guide means associated with said feeding and assembling means for receiving therein the convolutions of said springs and for guiding same in a fixed path aligned with the fixed position of said clamping members during feeding movement.

5. In a machine for the assembly of three-part clothespins of the character comprising a pair of clamping members connected by a spring structure which structure includes a pair of laterally spaced convolutions arranged in substantially parallel planes, said machine comprising means for retaining said clamping members in fixed position, said retaining means including a fixed seat and a plurality of spring-pressed jaws for locating said clamping members in a position to be assembled with said spring structure, means positioned adjacent said retaining means for feeding and assembling said spring with the clamping members, and guide means associated with said feeding and assembling means for receiving a portion of said convolutions during feeding movement and keeping them aligned with the fixed seat, one of said jaws cooperating with said fixed seat to retain said clamping members in a positive position at a first stage of said assembly, a second of said jaws operating to retain said clamping members in a positive position during a second stage of said assembly.

6. In a machine for successively assembling a series of pairs of clamping members with a spring to make a series of three-part clothespins, means for successively retaining pairs of clamping members in a fixed position, a reciprocal plunger for moving successive springs into assembly with successive pairs of clamping members, means positioned adjacent said plunger for successively engaging each spring during each operative movement of said plunger, and means to move said last mentioned means away from spring engaging position to permit the feeding of succeeding springs into position for corresponding movement by said plunger.

7. The structure recited in claim 6, means for linking said last mentioned means to said plunger so that the movement of said spring engaging means and said plunger will be timely coordinated.

8. The structure recited in claim 6, and spring pressed means for engaging each of said springs after they are moved by said plunger from engagement with said first mentioned spring engaging means, whereby each spring will be carefully guided throughout the assembly operation.

9. In a machine for successively manufacturing three-part clothespins from pairs of clamping members and wire, a frame, means mounted on said frame for making a series of wire springs one after the other, a post positioned adjacent said spring making means, means positioned on said frame for feeding wire to said spring making means, means adjacent said post for supporting said fed wire thereon, means engaging said wire for bending said wire around said post, means engaging said supporting means for moving said supporting means to a position adjacent said post and a position away from said post whereby finished springs will be free of said supporting means and may be guided to assembly position.

10. In a machine for successively manufacturing three-part clothespins from pairs of clamping members and wire, means for making a series of wire springs one after the other, said spring making means including a guide means for guiding the feeding of finished springs, a base plate extending about said guide means in a plane substantially perpendicular thereto, a wire feeding means supported upon said base plate, a wire supporting means movable along said base plate into position adjacent said guide means to receive wire fed from said wire feeding means, means movable with said supporting means to bend said wire partly about said guide means, a pair of rotatable wire bending members adjacent said bending means for producing a spiral convolution in said wire, means engaging said bending members for rotating said bending members, means associated with said bending members for moving said bending members away from said guide means to release and permit movement of finished spring along said guide means, means adjacent said guide means for receiving finished spring members from said guide means, and means cooperating with said receiving means for assembling said receiving springs with said clamping members to make clothespins.

11. In a machine for successively manufacturing three-part clothespins from pairs of clamping members and wire, means for successively making wire springs from said wire, said wire making means comprising a bed plate extending in a generally horizontal plane, wire bending means supported on said bed plate, a guide post extending from said wire bending means to a second bed plate extending in a generally horizontal plane, said second bed plate supporting spring and clamping member assembly means, whereby said guide post is in a position to guide finished springs from said wire bending means to said assembly means where individual clothespins are completed successively.

12. The structure recited in claim 11, wherein the springs formed have an internal geometric shape, and said guide post has a corresponding geometric section, whereby said guide post may effectively guide finished springs.

13. In a machine for successively manufacturing three-part clothespins from pairs of clamping members and wire, a frame, means mounted on said frame for successively making springs from said wire, said spring making means including wire bending means and guide means, said wire bending means comprising means for bending said wire about said guide means, means engaging said wire bending means for moving said wire bending means away from said guide means and an ejector positioned adjacent said guide means for urging finished spring structures out of wire bending position and along said guide means into assembly position and means mounted on said frame and receiving said springs from said guide means for assembling finished wire structures with said clamping members to form finished clothespins.

14. In a machine for successively manufacturing three-part clothespins from pairs of clamping members and wire, a frame, means mounted on said frame for making a series of wire springs, means positioned adjacent said spring making means for feeding wire thereto, said spring making means including a post, means adjacent said post for successively forming springs therearound, means engaging said spring forming means for moving said spring forming means to a first position adjacent said post, said spring forming means being moved from engagement with said spring after said spring is formed to release said spring on said post, whereby said post guides said spring from the forming position to an assembly position.

15. In a machine for successively manufacturing three-part clothespins from pairs of clamping members and wire, a frame, means mounted on said frame for making individual springs, means adjacent said spring making means for continuously feeding wire thereto, said spring making means including a cutting means for severing the wire, bending means adjacent said cutting means, and a transfer guide means cooperating with said bending means to form said springs, means adjacent said guide means for successively receiving finished formed springs, means engaging said receiving means for successively assembling said finished formed springs with said clamping members, means mounted on said frame for driving said spring forming means and said assembly means in a predetermined manner, whereby a single spring is formed in timed relation with the assembly of each single clothespin.

16. In a machine for successively manufacturing three-part clothespins from pairs of clamping members and wire, spring forming means including means for bending said wire into individual wire springs, and means adjacent said bending means for feeding individual springs to an assembly station, said assembly station including means for assembling said individual springs with successive pairs of clamping members, and means mounted on said machine for driving said wire bending means and said assembling means in synchronism so as to feed a spring in engagement with a pair of clamping members in timed relation.

17. In a machine for successively manufacturing three-part clothespins from pairs of clamping members and wire, a frame, means mounted on said frame for making individual springs, means adjacent said spring making means for continuously feeding wire thereto, said spring making means including a cutting means for severing the wire, bending means adjacent said cutting means, and a transfer guide means cooperating with said bending means to form said springs, means adjacent said guide means for successively receiving finished formed springs, means engaging said receiving means for successively assembling said finished formed springs with said clamping members, means mounted on said frame for driving said spring forming means and said assembly means in a predetermined manner, whereby a single spring is formed in timed relation with the assembly of each single clothespin, said receiving means being formed with a pair of guide grooves aligned with the bent wire of said spring, said transfer means including a guide post for guiding individual springs to the guide grooves of said receiving means.

18. In a machine for the assembly of three-part clothespins of the character comprising a pair of clamping members connected by a spring structure, which structure includes a pair of laterally spaced convolutions arranged in substantially parallel planes, said machine including means for retaining said clamping members in a fixed position, means positioned adjacent said retaining means for receiving said spring members from a spring making means, means engaging said receiving means for feeding said spring members toward said clamping members for assembly therewith, said receiving means being formed with spaced grooves which receive a portion of said convolutions and guide said spring members in aligned relation to the assembly position with said clamping members.

19. In a machine for successively manufacturing three-part clothespins from pairs of clamping members and wire, a frame, means mounted on said frame for feeding wire, a vertical post for receiving said wire in engagement therewith, wire bending means engaging said wire and adapted to bend said wire around said post and into a pair of spaced convolutions, a second wire bending means engaging said wire for bending the ends of said wire into parallel tails around said post to complete the spring forming operation, means engaging said wire during the bending operation for supporting the wire on said post, and means associated with said bending means and said supporting means for moving said bending and supporting means out of engagement with said newly formed spring, said spring thereby being freely movable on said post.

References Cited in the file of this patent

UNITED STATES PATENTS

| | | |
|---|---|---|
| 25,344 | Mason | Sept. 6, 1859 |
| 237,397 | Lewthwaite | Feb. 8, 1881 |
| 610,490 | Mann | Sept. 6, 1898 |
| 834,842 | Nutting | Oct. 30, 1906 |
| 1,192,631 | Hick | July 25, 1916 |
| 1,192,655 | Lyons | July 25, 1916 |
| 1,311,187 | Sleeper | July 29, 1919 |
| 1,616,641 | Tainter | Feb. 8, 1927 |
| 1,673,185 | Des Combes | July 12, 1928 |
| 1,829,651 | Henderson | Oct. 27, 1931 |
| 1,830,021 | Forney | Nov. 3, 1931 |
| 1,850,666 | Frenette | Mar. 22, 1932 |

FOREIGN PATENTS

| | | |
|---|---|---|
| 323,499 | France | Aug. 5, 1902 |